(12) United States Patent
Furlow, Jr.

(10) Patent No.: US 9,180,818 B2
(45) Date of Patent: Nov. 10, 2015

(54) BLIND-SPOT ELIMINATOR SIDE-VIEW MIRROR

(71) Applicant: Leonard T. Furlow, Jr., Gainesville, FL (US)

(72) Inventor: Leonard T. Furlow, Jr., Gainesville, FL (US)

( * ) Notice: Subject to any disclaimer, the term of this patent is extended or adjusted under 35 U.S.C. 154(b) by 278 days.

(21) Appl. No.: 13/778,399

(22) Filed: Feb. 27, 2013

(65) Prior Publication Data

US 2013/0222935 A1    Aug. 29, 2013

Related U.S. Application Data

(60) Provisional application No. 61/604,835, filed on Feb. 29, 2012.

(51) Int. Cl.
*G02B 5/10* (2006.01)
*B60R 1/08* (2006.01)

(52) U.S. Cl.
CPC .............. *B60R 1/081* (2013.01); *B60R 1/082* (2013.01)

(58) Field of Classification Search
CPC ............ B60R 1/08; B60R 1/082; B60R 1/088
USPC .......................... 359/850, 864, 867, 868, 869
See application file for complete search history.

(56) References Cited

U.S. PATENT DOCUMENTS

| | | | |
|---|---|---|---|
| 4,331,382 A | 5/1982 | Graff | |
| 4,497,541 A | 2/1985 | Okamura | |
| 5,280,386 A | 1/1994 | Johnson | |
| 5,563,744 A | 10/1996 | Matsumiya | |
| 5,579,133 A | 11/1996 | Black et al. | |
| 5,731,900 A | 3/1998 | Milner | |
| 5,793,542 A | 8/1998 | Kondo et al. | |
| 5,847,889 A | 12/1998 | Komiyama et al. | |
| 6,076,934 A | 6/2000 | Gerdes | |
| 6,101,048 A | 8/2000 | Wheeler | |
| 6,522,451 B1 * | 2/2003 | Lynam | 359/864 |
| 6,552,860 B1 | 4/2003 | Alden | |
| 6,932,483 B2 | 8/2005 | Strumolo et al. | |
| 6,937,404 B2 | 8/2005 | Bode et al. | |
| 6,979,090 B1 | 12/2005 | Wnuk | |

(Continued)

FOREIGN PATENT DOCUMENTS

| | | |
|---|---|---|
| JP | 1989-208245 | 8/1989 |
| WO | WO 02-057817 | 7/2002 |
| WO | WO 02-074583 | 9/2002 |

OTHER PUBLICATIONS http://www.campingworld.com/search/index.cfm?Ntt=hotspots+convex+blind+spot+mirror&N=0&Ntx=mode+matchallpartial&Ntk=primary&Nty=1&Ntpc=1&Ns=p_sort_default, pp. 1-2.

*Primary Examiner* — Euncha Cherry
(74) *Attorney, Agent, or Firm* — Saliwanchik, Lloyd & Eisenschenk

(57) ABSTRACT

The subject invention provides vehicle mirrors that increase the field of view on one or both sides of a vehicle to bring into view the area behind and lateral to the standard mirror's field of view (the "blind spot"). One embodiment utilizes a flat-plane mirror in conjunction with a horizontally-convex portion at one side. The purpose of the horizontally-convex vertically-straight design is to maintain the vertical dimension of the image to retain proper perception of distance. Utilizing the mirrors of the subject invention, a vehicle driver is able to see directly behind and to the side of the vehicle with maintenance of distance perception. The horizontally-convex portion increases the driver's field of view along the rear and side of a vehicle eliminating or reducing blind spots.

22 Claims, 8 Drawing Sheets

(56) References Cited

U.S. PATENT DOCUMENTS

| | | |
|---|---|---|
| 7,025,469 B1 | 4/2006 | Manfre' et al. |
| 7,129,829 B2 | 10/2006 | Chan |
| 8,128,244 B2 | 3/2012 | Lynam |
| 8,238,050 B2 | 8/2012 | Minano et al. |
| 2003/0039039 A1 | 2/2003 | Thomas et al. |
| 2003/0081334 A1 | 5/2003 | Skinner |
| 2005/0083595 A1 | 4/2005 | Mostrom |
| 2007/0146912 A1 | 6/2007 | Juska |
| 2008/0231981 A1 | 9/2008 | Wada |

* cited by examiner

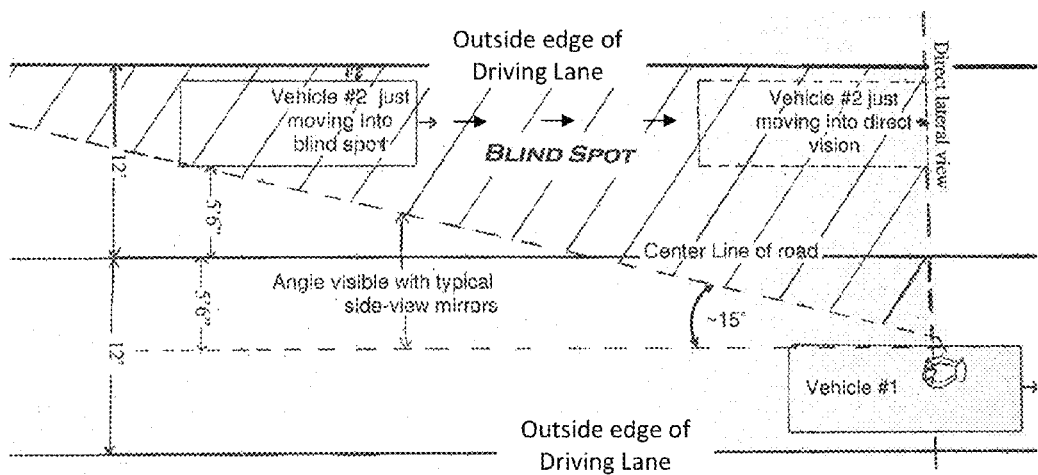
FIG. 1
(Prior art)
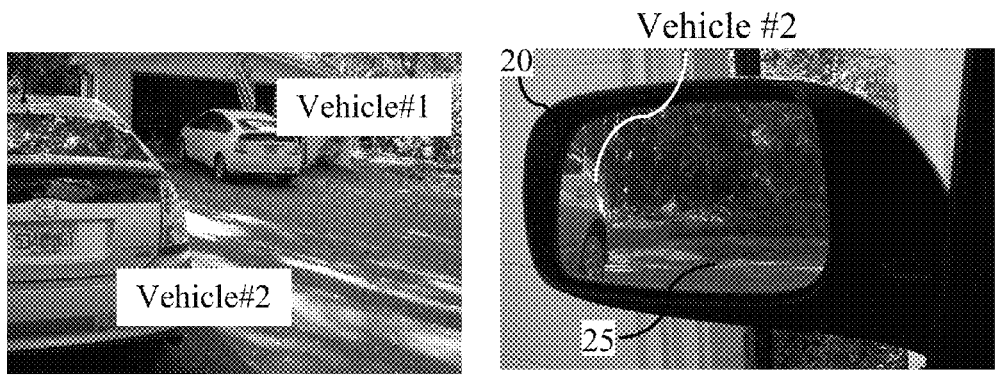
FIG. 2A
(Prior Art)
FIG. 2B
(Prior Art)

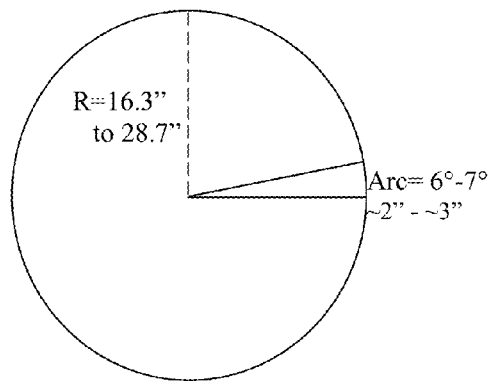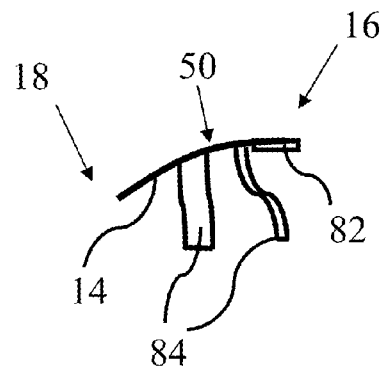
FIG. 10
FIG. 11
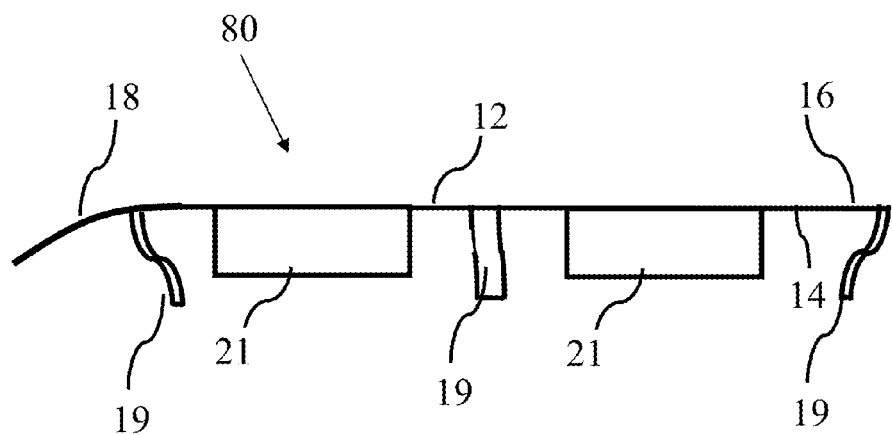
FIG. 12

BLIND-SPOT ELIMINATOR SIDE-VIEW MIRROR

CROSS-REFERENCE TO RELATED APPLICATION

The present application claims the benefit of U.S. Provisional Application Ser. No. 61/604,835, filed Feb. 29, 2012, which is hereby incorporated by reference herein in its entirety, including any figures, tables, or drawings.

BACKGROUND OF INVENTION

Despite the many design advances made to vehicles, most on the road today do not provide drivers with a full 360° field of view (FOV). During the time a vehicle passing or being passed is not in view it may constitute a danger because the driver may be unaware of its presence or misjudge its distance.

While the windows of vehicles generally provide sufficient direct front and lateral views, most vehicles include side-view mirrors to provide additional rearward FOV. However, most side-view minors have a characteristic "blind-spot" between the area lateral to the side-view minor's field and behind the driver's direct lateral vision. As an adjacent vehicle approaches to pass in an adjacent lane, it is visible in the driver's rear-facing side-view mirror until it disappears from the viewing range of the minor. It remains out of sight until it appears again in the lateral vision of the driver. There is a similar blind spot on the passenger's side of the vehicle. One study has shown that, on average, drivers can see an angle of about 14.0° rearward in the driver's side-view minor and an angle of about 19.8° in the side mirror on the right. (Reed, M. P., Lehto, M. M., Flannagan, M. J. "Field of View in Passenger Car Minors," University of Michigan Transportation Research Institute Report No. UMTRI-2000-23, Jun. 2000, Ann Arbor, Mich.).

In many vehicles the door frames and the body sections behind the back windows interfere with vision in the standard front windshield-mounted mirror. While side-view minors, mounted outside the vehicle's body, typically do not have this problem, efforts have been made to reduce or eliminate the above-described blind spots by modifying the side-view minors.

One solution has been to use spherically-convex side-view mirrors on the passenger side of the vehicle. Because a standard driver's side-view minor is a substantially planar reflective surface, so as to preserve a driver's perception of distance, a spherically convex mirror can be added as an attachment. However, spherically-convex mirrors provide a flawed view because an object reflected therein often appears significantly smaller. This is quite obvious when one looks at another vehicle in both the front windshield-mounted planar mirror and the passenger-side spherically-convex passenger-side mirror. The side-view mirror image is considerably smaller, which makes the vehicle appear to be more distant than it is actually. Thus, the increased FOV provided by the spherically-convex mirror is obtained at the cost of a reduction in image size, which, if not accounted for by a driver, can cause a dangerous misjudgment of distance.

There is a safety need for a vehicle mirror with an increased FOV that eliminates the lateral area blind spot behind a driver's lateral vision. Ideally, such a mirror would provide a FOV that extends from the side of the vehicle and outboard to a point where at least some part of an adjacent vehicle is visible until that vehicle can be seen in the driver's lateral vision. This can ensure that the viewed adjacent vehicle is, at least partially, in a driver's vision at all times. There is also a need for such mirrors to provide a reflected image that preserves the driver's ability to accurately judge the distance to other vehicles or objects by providing minimal vertical distortion of the image and as little horizontal distortion of the image as will still permit visualization of vehicles in the blind spot until they appear in the driver's lateral vision.

BRIEF SUMMARY

The subject invention provides a side-view mirror for a vehicle that increases the field of view (FOV) of adjacent vehicular lanes while preserving a driver's perception of distance when viewing an adjacent vehicle within the side-view mirror. Embodiments of the subject invention allow adjacent vehicles that are located behind and lateral to remain in view of a driver until the adjacent vehicle, which can be passing or is being-passed, comes into the lateral view of the driver. Embodiments of the subject invention also provide an advantage of minimizing distortion of adjacent vehicles, so as not to inhibit a driver's perception of distance to the adjacent vehicle. These and other advantages can be provided by optimizing the horizontal curvature of a side-view mirror without undesirably increasing the overall size of a typical side-view mirror.

In one embodiment, a side-view mirror of the subject invention is substantially planar along the proximal side, which would be nearest to a driver in a vehicle, and as it extends laterally, the distal side that is furthest from the driver of a vehicle, is a horizontally-convex, vertically-straight segment. In a further embodiment, the more distal horizontally-convex portion of the mirror extends the driver's lateral vision by approximately an additional 20° beyond that provided by typical side-view mirrors. This can be even an improvement over other known curved side-view mirrors. Advantageously, this increase in lateral vision can be adequate to eliminate the typical blind spot, and the horizontal-curvature can provide a reflected image in which an adjacent vehicle appears horizontally narrower, but with an undistorted and constant vertical dimensions.

The lack of vertical distortion can provide the further advantage of allowing a driver to make a more accurate evaluation of an adjacent vehicle's distance. Ideally, the dimensions and curvature of the horizontally-convex portion of a side-view mirror of the subject invention are optimized to increase a driver's FOV with only the minimal necessary distortion of the image. In a specific embodiment, a driver's FOV is increased along the lateral side, such that an adjacent vehicle, or other object, can be viewed within the horizontally-convex portion up to the point, or even beyond the point, where the object can be detected within the driver's lateral vision.

Thus, with the embodiments of the subject invention, all, or at least some portion of, an adjacent vehicle, whether passing or being passed, remains always in sight, either within the side-view mirror and/or within the driver's direct lateral or peripheral vision. Advantageously, these improvements are achieved without having the diminished overall image size typically caused by spherically-curved convex mirrors. With these embodiments, an image appears in normal ratio within the flat-planar portion and becomes more horizontally-compressed when viewed in the horizontally-convex portion. Thus, the vertical dimensions of the object can remain substantially constant, which can preserve the viewer's perception of distance.

The side-view mirror of the subject invention, when installed on a vehicle, on either, or both, sides, provides a larger view of the outboard area of the driver's vehicle, as provided by the flat-planar portion that provides a direct rear view, and extends the outboard FOV more laterally, as provided by the horizontally-convex segment. Advantageously, all or at least a portion of a viewed vehicle, that is one which is being passed or is passing, remains within the driver's sight in the side-view mirror and/or within direct lateral or peripheral vision at all times. Also advantageously, the use of a horizontally-convex segment causes the image to be compressed horizontally, but not vertically, preserving the vertical dimension of the image in all sections of the mirror. In a preferred embodiment, the image of an adjacent vehicle in the convex portion of the mirror should be as minimally narrowed as will still allow visualization of at least a portion of the adjacent or passing vehicle until it comes into the direct lateral or peripheral vision of the driver being passed. Thus, a driver's judgment of the distance to an object seen in the mirror remains realistic.

The embodiments disclosed herein can be part of a permanent installation, such as, for example, during the vehicle's manufacture. In an alternative embodiment, the mirror of the subject invention can be configured as one or more separate components that can be attached to an already existing vehicle mirror. In a particular embodiment, a horizontally-convex segment is configured as a component that can be attached to an already installed flat-surface or curved surface mirror.

The subject invention addresses the above described disadvantages associated with planar and spherically-curved mirrors by providing the advantage of an increased FOV with minimal or no loss of distance perception. In particular, the subject invention provides novel, inexpensive, and highly effective methods and devices for increasing the FOV of a vehicle driver.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 1 is a diagram illustrating the blind spot area of a typical vehicle. In this diagram, the driver's vehicle is Vehicle #1 (in the right lower corner). The passing vehicle is Vehicle #2 (shown at the top of the diagram, entering and exiting the blind spot). This illustration shows the maximum possible blind spot area. Here the blind spot distance and angle measurements are demonstrated using the dimensions of two typical small vehicles (2005 Toyota Prius), and with the vehicles being within 1 foot of the outer edge of their respective driving lanes, which results in a blind spot of maximum area. When the vehicles are driving nearer the center of their respective driving lanes (nearer each other), the blind spot becomes smaller, but is still present.

FIG. 2A is a photograph illustrating how, in a typical vehicle side-view mirror, vehicle #2, in its approach to pass vehicle #1, is just entering the blind spot of vehicle #1.

FIG. 2B is a photograph illustrating how in a typical vehicle side-view mirror, the passing vehicle in FIG. 2A is still partially visible to the driver in the side-view mirror of vehicle #1, but will soon be out of visible range.

FIG. 10 is a diagram that illustrates the approximate radius of a circle for an arc of a given angle and length. Average radius in inches can be determined by the equation:

Figure 3A:
FIG. 3A is a photograph illustrating the position of passing vehicle #2 when it enters the blind spot of vehicle #1, as seen from the driver's side window of vehicle #1.
Figure 3B:
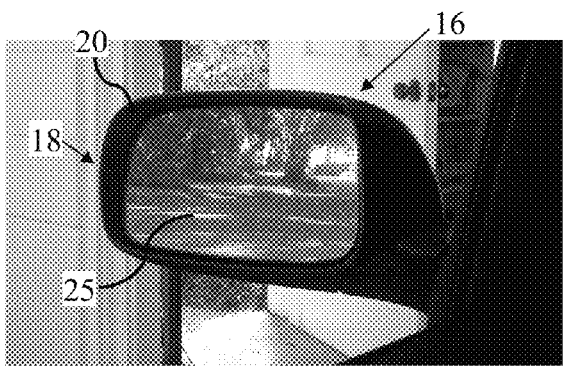
FIG. 3B is a photograph illustrating in a typical vehicle side-view mirror that when the passing vehicle #2 in FIG. 3A enters the blind spot it is no longer in view in the side-view mirror, and is also not yet in the lateral vision of the driver in vehicle #1. In this scenario, the driver of vehicle #1 may well be unaware of the location of vehicle #2 without turning sufficiently to see vehicle #2 at least peripherally.

$$R = 180 \times \text{arc length} / \text{arc degrees} \times \pi.$$

where R is the radius of the circle, arc length is measured in inches; and arc degrees is the angle of the arc.

FIG. 11 illustrates an embodiment of a horizontally-convex component that utilizes one or more clips and/or an adhesive area for attaching to an already existing vehicle mirror structure.

FIG. 12 illustrates an embodiment of a side-view mirror of the subject invention as a separate component where the rigid mirror has one or more clips for attaching to an existing side-view mirror of a vehicle.

DETAILED DISCLOSURE

The subject invention pertains to mirrors for increasing visibility. More specifically, the subject invention provides vehicle mirrors capable of providing increased field of view (FOV). In certain embodiments, the mirrors of the subject invention provide a FOV that can include the area proximal to and to the rear of a vehicle to a point where a vehicle in an adjacent lane appears in a driver's lateral vision. Still more specifically, the subject invention provides side-view or "wing" mirrors for vehicles that will allow a FOV that is both behind and lateral (i.e., to the sides of) a vehicle. With these embodiments, objects that are adjacent to a first vehicle, such as a second or adjacent vehicle, that may be passing on either side of, or otherwise moving around, the first vehicle, will remain in mirror view until they are within the approximate lateral view of the vehicle driver.

The mirrors of the subject invention are particularly useful when operating vehicles on multi-lane roads. However, a person with skill in the art will be able to recognize numerous other uses that would be applicable to the devices and methods of the subject invention. Such as, for example, uses to provide increased FOV for security purposes, such as seeing down hallways or around corners. While the subject application describes, and many of the terms herein relate to, a use for vehicle driving, other modifications and uses apparent to a person with skill in the art and having benefit of the subject disclosure are contemplated to be within the scope of the present invention.

Reference is made throughout the application to the "proximal side" or "near" side and "distal side" or "lateral" side. As used herein, the proximal or near side refers to an area, or that side of a mirror, that is nearest to a vehicle. Conversely, the distal or lateral side refers to an area, or that side of a mirror, that is farthest from the vehicle.

As used herein, a lateral view is one observed at right angles to a vehicle's direction of movement, without aid of a mirror. Such observation can be direct, such as by turning the head or body, or it can be indirect, such as with peripheral vision.

Also, as used in the subject invention, "vehicle #1" refers to a vehicle having on the driver's side a mirror embodiment according to the subject invention and "vehicle #2" refers to a vehicle that is adjacent to vehicle #1. More specifically, as used herein, vehicle #2 refers to one that is to the rear of and lateral to vehicle #1. In specific examples used herein, vehicle #2 is one that is to the rear of and lateral to vehicle #1 and is moving towards vehicle #1 in an adjacent driving lane.

The present invention is more particularly described in the following examples that are intended to be illustrative only, since numerous modifications and variations therein will be apparent to those skilled in the art. As used in the specification and in the claims, the singular for "a," "an" and "the" include plural referents unless the context clearly dictates otherwise.

Reference will be made to the attached figures on which the same reference numerals are used throughout to indicate the same or similar components. With reference to the attached figures, which show certain embodiments of the subject invention, it can be seen that the subject invention comprises a rigid mirror 10 having a flat planar portion 30 and a horizontally-convex portion 50. Alternative embodiments include a horizontally-convex portion configured as a separate component 80 that can be fixedly attached to a standard flat-plane or slightly-curved surface mirror.

Figure 7:
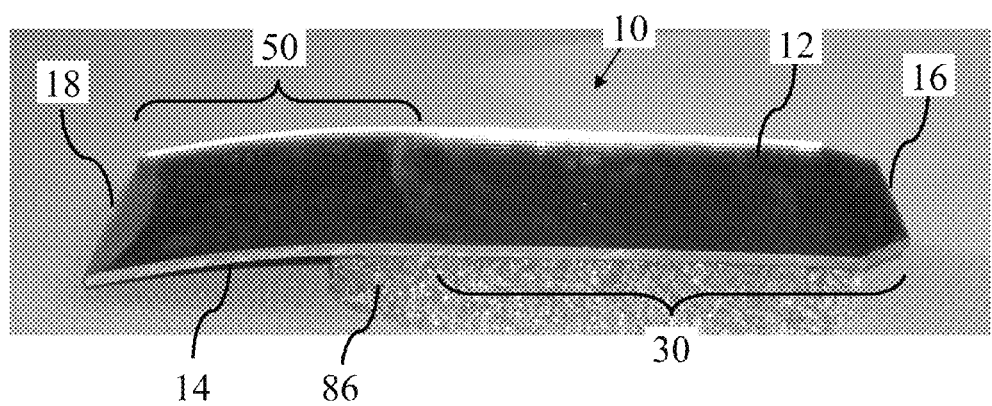
FIG. 7 is a photograph showing one embodiment of a side-view mirror of the subject invention. In this embodiment, a side-view mirror has a planar portion that can extend laterally from a vehicle and a horizontally-convex segment extending further laterally and further outbound from the planar portion, which extends the driver's field of view (FOV) in the side-view mirror into the blind spot area.

With reference to FIG. 7, it can be seen that in one embodiment the rigid mirror 10 can be, in general, a substantially rigid piece of material having a front surface 12 with reflective properties and a rear surface 14, a proximal side 16, or near side, and a distal side 18, or lateral side. As will be discussed below, it is the shape imparted to the mirror material that can increase the FOV.

In one embodiment, the material of the mirror provides minimal or no distortion value, such that the material of the mirror does not appreciably or adversely affect the visible image. Alternative embodiments can include a mirror material that provides at least some distortion value, where the material of the mirror does have an effect on the visible image. For example, the mirror material can be colored so that it can impart a color or hue to reflected images therein. In a more specific embodiment, the mirror is a glass that has minimal or no distortion value. In an alternative embodiment, the mirror is manufactured of a generally durable material, such as, for example, a non-breakable material, such as, but not limited to, plastic, nylon, metal, or other generally non-breakable material with minimal or no distortion value. Alternative materials and/or substances can also be utilized for the mirror, as long as they do not alter the operation of the subject invention. A person with skill in the art would be able to determine any of a variety of substances, materials, or devices that could be utilized as the reflective material for the subject invention. Such variations are within the scope of the subject invention.

In one embodiment, the rigid mirror 10 has a flat or planar portion 30, where at least a front surface 12 is substantially flat, such that an image seen therein is substantially undistorted, i.e., the aspect ratio is unaffected. Some standard vehicle side-view mirrors have a curvature designed to increase the FOV of a driver. However, such curvature typically increases the FOV by only a few degrees and causes minimal distortion of an image therein. An alternative embodiment of the subject invention can include a planar portion having a slight curvature, such as that which is currently commonly used on most vehicle mirrors.

The rear surface 14 of the planar portion 30 can also be substantially flat or planar. Alternatively, the rear surface can be shaped or configured as necessary, or can include secondary components, to assist with mounting, seating, or otherwise securing the mirror to another object, such as, for example, a vehicle or a vehicle side-view mirror.

In one embodiment, between approximately 53% to approximately 69% of the proximal side 16 of the mirror comprises the planar portion 30, as measured from the proximal end 16 to the distal end 18. In a more particular embodiment, between approximately 61.5% to approximately 64% of the proximal side of the mirror comprises the planar portion 30, as measured from the proximal end 16 to the distal end 18. In a specific embodiment, between approximately 4.0 inches to approximately 5.0 inches of the proximal side 30 of the mirror comprises the planar portion 30, as measured from the proximal end 16 to the distal end 18. An example of this specific embodiment is shown in FIG. 7.

Figure 4A:
FIGS. 4A and 4B are photographs illustrating that the passing vehicle #2, which is in the blind spot shown in FIGS. 3A and 3B, reappears only when it becomes nearly even with the driver's vehicle (FIG. 4A) at which point it comes into direct lateral or peripheral view of the driver of vehicle #1 (FIG. 4B).
Figure 4B:

The FOV provided by a standard flat plane mirror 25 on a vehicle varies depending upon how a driver adjusts the mirror to see the outboard side, or the lateral side area, of the vehicle. One study indicated that, on average, drivers could see about 14.0° outboard on the left and about 19.8° outboard on the right. (Reed, M. P., Lehto, M. M., Flannagan, M. J. "Field of View in Passenger Car Mirrors," University of Michigan Transportation Research Institute Report No. UMTRI-2000-23, June 2000, Ann Arbor, Mich.). Thus, there can be a considerable outboard blind-spot area between the rear FOV provided by the planar portion 30 of the mirror and the lateral vision of a driver. FIGS. 1, 2A, 2B, 3A, 3B, 4A, 4B, and 6 illustrate this point. FIG. 1 demonstrates how the driver of a first vehicle (vehicle #1) in a standard 12 ft. wide driving lane has a limited FOV when utilizing a standard flat-surface mirror provided on most vehicles. In FIG. 1, it can be seen that as a vehicle in an adjacent driving lane, vehicle #2, moves closer than about 53 ft. (see also FIG. 6) from the rear lateral side of Vehicle #1, Vehicle #2 will disappear from the FOV of the mirror of Vehicle #1 until time that it reaches the lateral view of the driver of Vehicle #1. This illustrates that there is a considerable blind spot distance between the FOV of a typical flat-surface minor and the lateral FOV of the driver. FIG. 2A shows from a rear perspective an example of a passing vehicle (Vehicle #2) located well behind a vehicle that it will pass (Vehicle #1). In this photograph, the lateral distance between vehicles reflects how far apart they would be if each was within about 1 foot of the outside edge of their respective driving lanes, as illustrated in FIG. 1, which results in a maximum blind spot area. FIG. 2B shows the passing vehicle (Vehicle #2) to be still visible in the to-be-passed vehicle's (Vehicle #1) side-view mirror. FIG. 3A shows the passing vehicle moved nearer to vehicle #1, at which point (shown in FIG. 3B) it is no longer within view of the side-view mirror of vehicle #1; thus, it is out of sight and in the blind spot. In FIG. 4A, the passing vehicle has moved up and, as shown in FIG. 4B, has come into the lateral view of the driver of Vehicle #1, as shown from the driver's side window.

Figure 6:
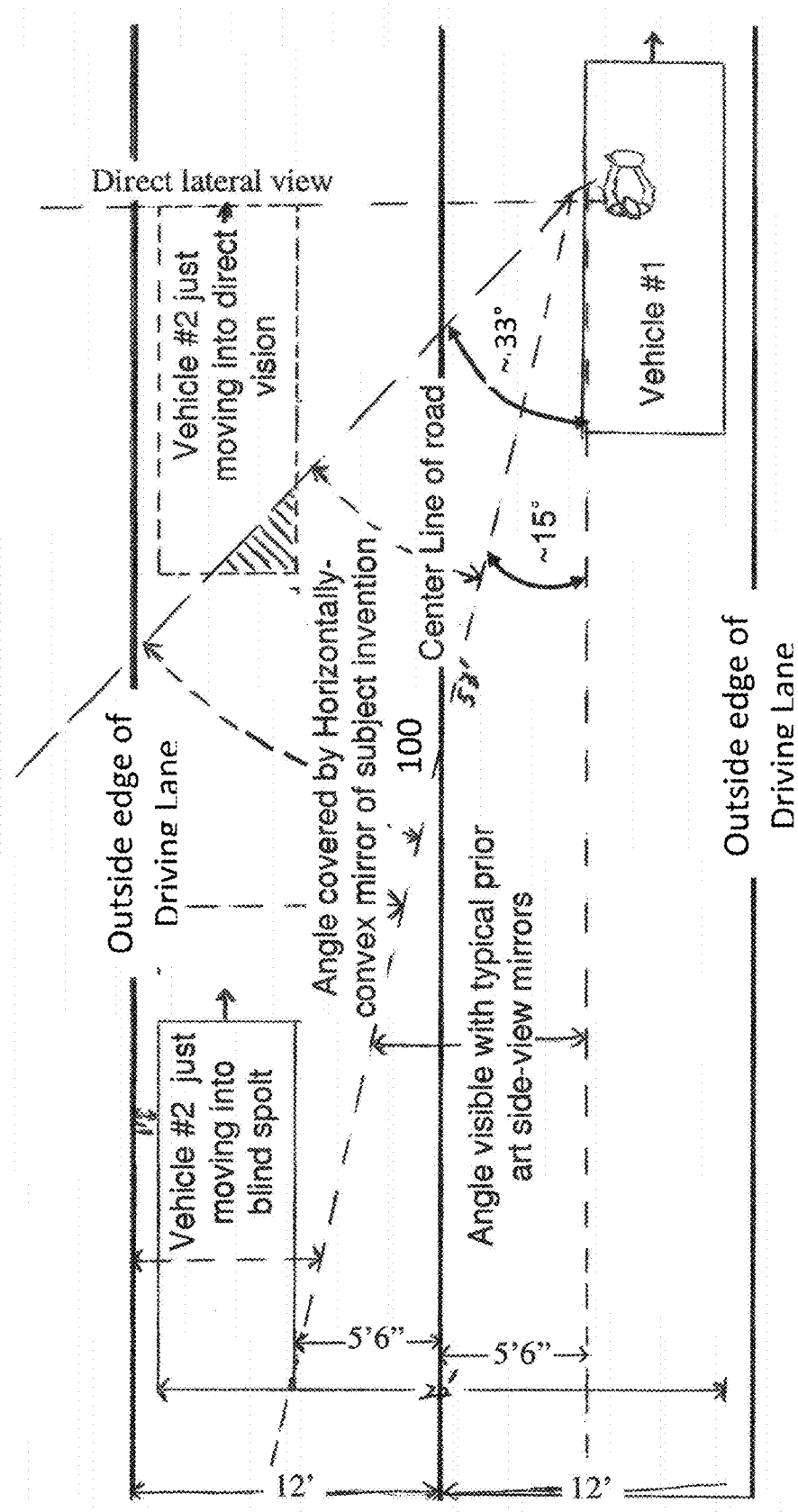
FIG. 6 is a diagram illustrating the field of view (FOV) provided by a typical side-view vehicle mirror, which is typically about 14° to about 15°, and the improved FOV provided by embodiments of the side-view mirrors of the subject invention. Note that the FOV provided by the mirror embodiments of the subject invention increase the driver's angle of view, as shown in this illustration, from about 15° outboard from the side of a vehicle to about 33° outboard from the side of a vehicle. This increased angle of the FOV is sufficiently wide to maintain a passing vehicle #2 in a driver's side-view mirror until such time that the vehicle has appeared in the lateral or peripheral vision of the driver of vehicle #1.

Advantageously, the embodiments of the subject invention eliminate the above-described blind-spot area for increased driving safety. In one embodiment, the rigid mirror 10 of the subject invention has a convex portion 50 extending from the planar portion 30. In a more particular embodiment, the mirror has a convex portion 50 extending from the distal side 18 of the planar portion 30. In a still more particular embodiment, an example of which is shown in FIG. 7, the convexity of the lateral portion is directed towards the rear surface 14, such that the distal side curves away from the front surface 12. This convex portion can reflect an arc that shows more of the outboard area 100, as shown in FIG. 6. Thus, it can increase the rear lateral FOV of a driver.

In a specific embodiment, the mirror has a horizontally-convex 50 portion that extends from the distal side 18 of the planar portion 30. Utilizing a horizontally-convex portion increases the rear lateral FOV, as described above. In addition, by utilizing a horizontally-convex portion, an image that is viewed therein is seen as being horizontally-compressed, but has minimal or no effect on the vertical dimension, or height, of a reflected image. Advantageously, it can also maintain the driver's perception of distance with regard to viewed objects.

Figure 8A:
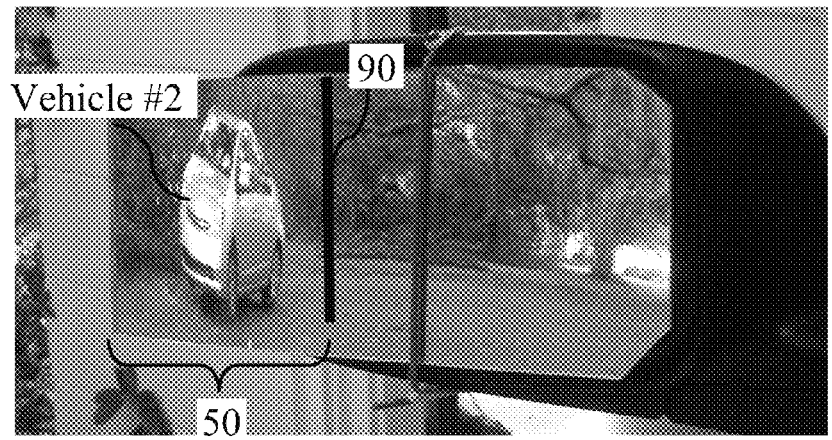
FIG. 8A is a photograph of the embodiment of the subject invention shown in FIG. 7 temporarily mounted on an existing side-view mirror of a vehicle. In this view it can be seen that with an embodiment of the subject invention, a passing vehicle is within the field of view of the convex portion of the mirror after the passing vehicle has disappeared from the planar portion of the mirror and entered what would typically be the blind spot area.
Figure 8B:
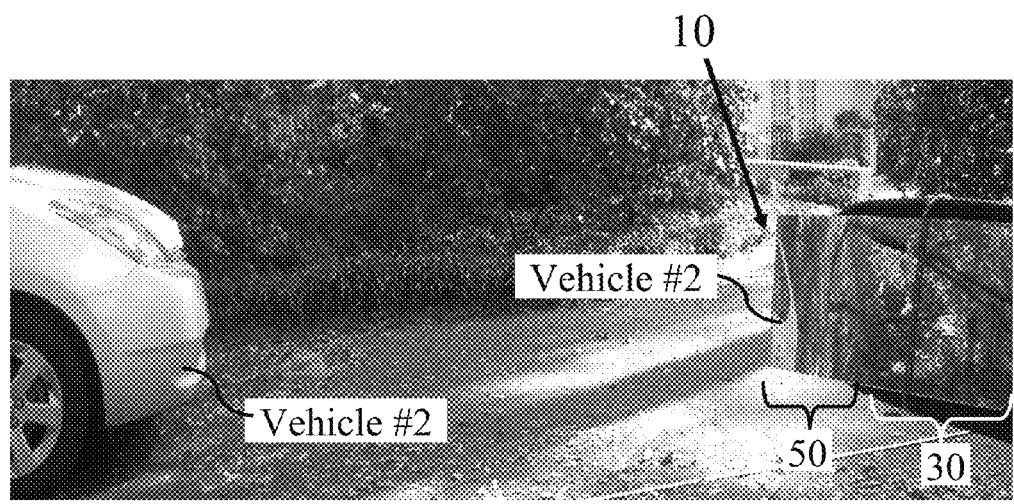
FIG. 8B is a photograph showing that the passing vehicle remains visible in the blind spot mirror even after it has appeared in the driver's direct view laterally.

One example of this embodiment, utilized on a vehicle, is shown in FIG. 8B and illustrates the effect of an object viewed on a horizontally-compressed portion. It is generally understood that the height of a viewed object, more so than the width, is used to visually determine distance. Thus, by preserving the vertical dimensions of an object as constant when viewed in a mirror of the subject invention, a driver's perception of the object's distance is minimally affected; thus, distance to an object seen in the planar portion of the rigid mirror 10 can be more accurately determined. In an ideal embodiment, an image seen in the convex portion of a mirror of the subject invention is as minimally narrowed as will allow at least a portion of an adjacent vehicle to be seen until it comes into the lateral view of the driver. In other words, the curvature of the convex portion of a mirror of the subject invention can provide adequate FOV from the rear lateral area of a vehicle to a point approximately equivalent to a driver's lateral vision area, while imparting minimal image compression.

In one embodiment, the curvature of the horizontally-convex portion 50 is defined as an arc of between approximately 5.5° to approximately 7.5° as defined by a circle having a radius of between approximately 15.25 inches and approximately 36.0 inches. In a further embodiment, the horizontally convex portion is an arc of between approximately 2 inches and approximately 3.5 inches in length, from the proximal end 16 to the distal end 18, as shown, for example, in FIG. 6 and FIG. 10. Preferably, the arc and length of the convex portion will provide a FOV of between approximately 30° and approximately 35° outboard from the side of a vehicle. In a specific embodiment, the arc and length of the convex portion provides a FOV of approximately 33° outboard and to the rear lateral side 100 of a vehicle.

In a specific embodiment, a mirror of the subject invention has a planar portion 30 that is approximately 4 inches to approximately 5 inches in length from the proximal end 16 to the distal end 18 and a horizontally convex portion 50 that is approximately 2 inches to approximately 3.5 inches. Thus, the total length of a mirror embodiment of the subject invention can be between approximately 6 inches to approximately 7.5 inches in length, from the proximal to the distal ends. In a further specific embodiment, a mirror of the subject invention can provide a FOV from the proximal side of a vehicle outbound to an angle of approximately 33°.

Figures 9A, 9B, 9C, 9D:
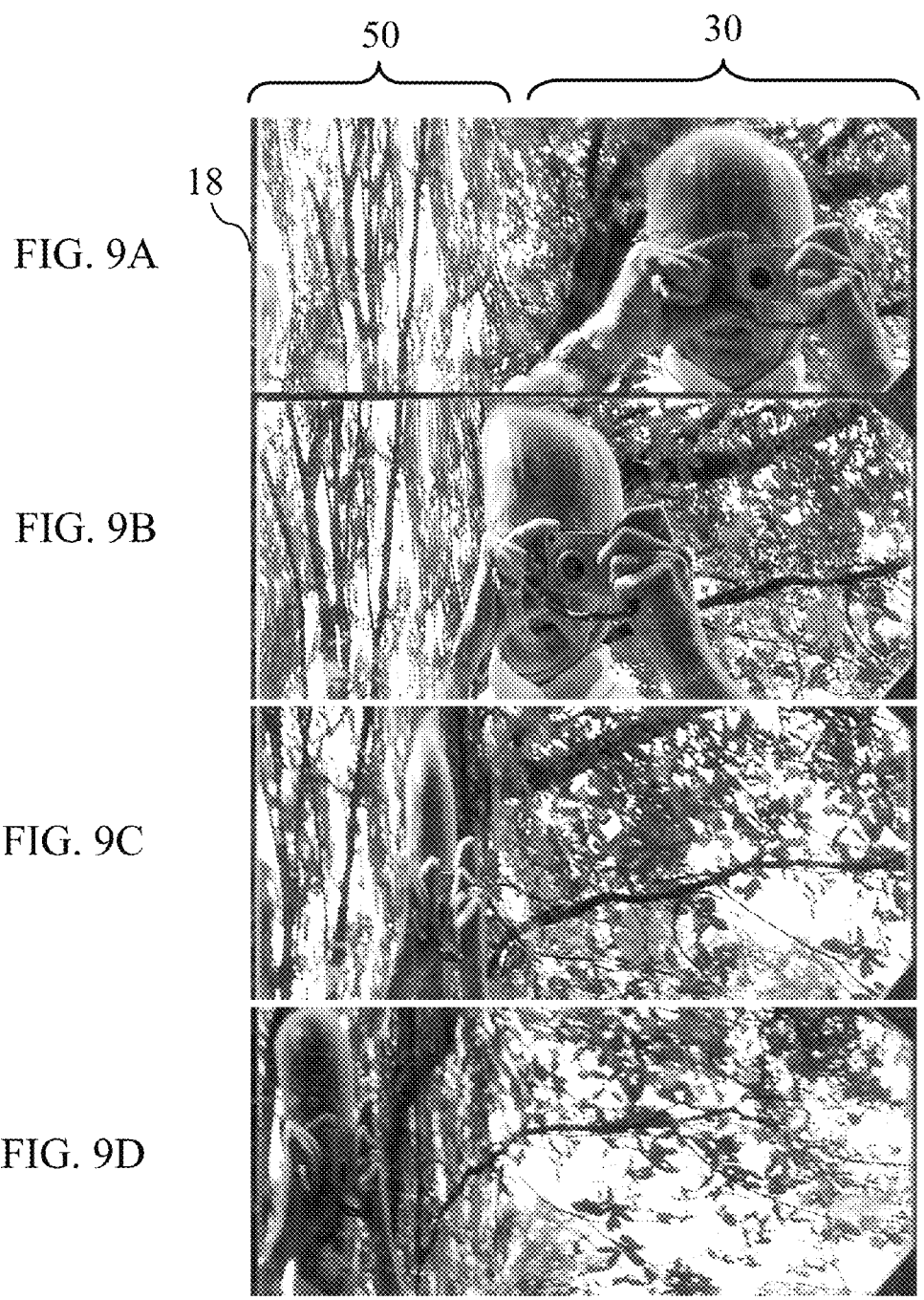
FIGS. 9A-D illustrate the progression of an image seen in an embodiment of the subject invention. As shown, the image has normal dimensions in the flat-planar portion (FIG. 9A) and becomes more horizontally-compressed (FIGS. 9B and 9C) as it moves into the horizontally-convex portion. Notice that the height of the mirror image does not change, which can preserve the viewer's perception of size and distance.

FIGS. 9A-D illustrate a progression of images as seen with an embodiment of a mirror of the subject invention. In the example shown in FIGS. 9A-D, the planar portion 30 causes little or no distortion to the image in FIG. 9A. The horizontally-convex portion 50, which comprises the lateral end 18 of the mirror, begins to compress the image (FIG. 9B) as it becomes visible in that portion of the mirror, until it is seen at maximum compression in the horizontally-convex portion (FIGS. 9C and 9D). However, it can be seen that as the image progresses from the proximal side of the mirror to the distal side, becoming horizontally-compressed as it moves, the vertical dimensions of the image remain constant across the entire length of the mirror.

FIGS. 8A and 8B illustrate an embodiment of the mirror of the subject invention mounted on a vehicle. With this embodiment, a driver in vehicle #1 can see a vehicle #2 that is located in an area adjacent to and to the rear of vehicle #1, to a point where vehicle #2 is within the lateral view of the driver. In FIG. 8A it can be seen that the image of vehicle #2 (i.e., the passing vehicle) has passed out of the planar portion of the mirror of the subject invention and would typically, at this point, be within the blind spot, but is still visible in the convex portion of a mirror of the subject invention. As seen in FIG.

8B, as vehicle #2 moves to within the lateral, or peripheral, view of the driver, it is still visible within the horizontally convex portion of the mirror.

For some drivers, a demarcation between the horizontally convex portion 50 and the planar portion 30 can be helpful. Such demarcation can, for example, assist a driver in vehicle #1 in determining the location of vehicle #2 and whether it is safe to pull into the lane of or in front of vehicle #2. One embodiment of the subject invention includes a vertical line of demarcation 90 between the horizontally convex portion 50 and the planar portion 30. FIG. 8A illustrates an example of this embodiment. The line of demarcation 90 can be solid, dashed, dotted or any other shape configuration that would be visible to a driver. Alternatively, the line of demarcation can be a reflective material or be lighted.

Figure 5:
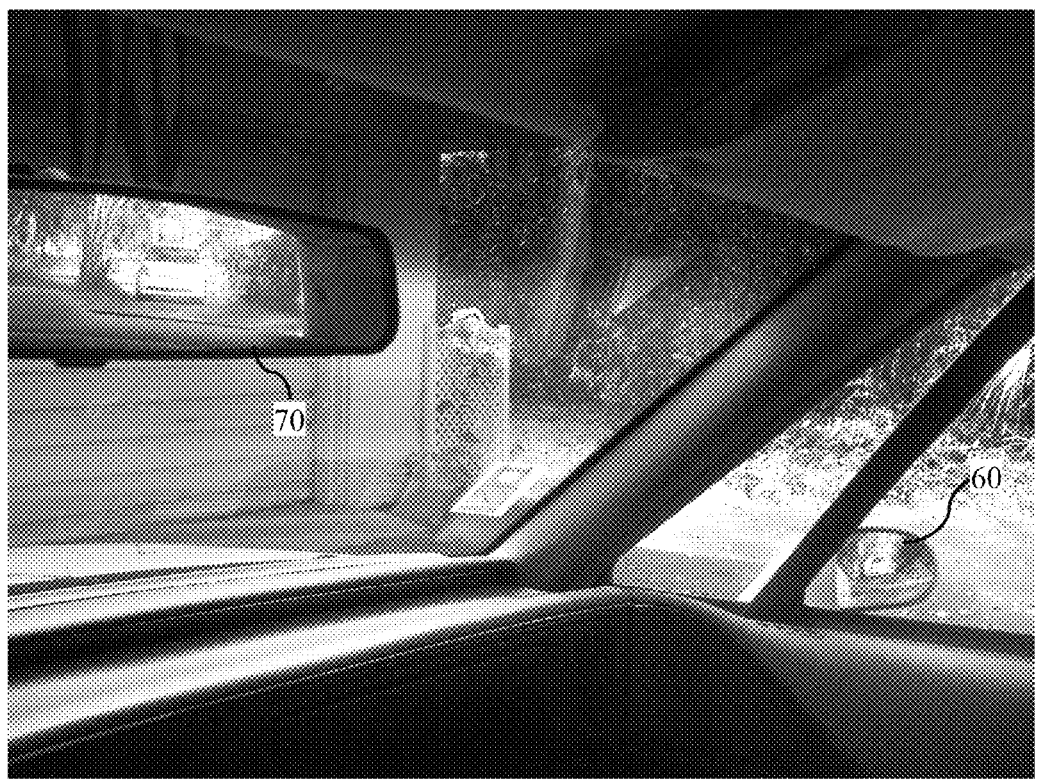
FIG. 5 is a photograph showing a vehicle as viewed in both a rear view mirror and a passenger side-view mirror. It can be seen that vehicle #2 appears to be much more distant when viewed in the spherically-convex mirror on the passenger side of most currently available vehicles than when viewed in the front windshield-mounted planar rear-view mirror. Thus, drivers must typically rely upon the windshield-mounted rear view mirror's undistorted view to determine the actual distance of vehicle #2, when visible. While the rear view mirror can be helpful, such as, for determining when it is safe to move into the driving lane of vehicle #1 after passing it, it has limited value for lateral viewing.

FIG. 5 is a photograph that illustrates the distortion a spherically convex mirror produces. The same vehicle viewed in the spherically-convex passenger-side mirror 60 appears significantly more distant than it appears in the planar front mirror (rear view mirror) 70. Thus, the windshield-mounted rear view mirror can provide a more accurate perception of distance; thus, the advantage of an increased FOV provided by the spherically-convex mirror is offset by the reduction in image size. Because the side-view mirror image is considerably smaller, it can appear to be more distant than it actually is.

The mirrors of the subject invention can be factory installed on a vehicle during manufacturing. As with a standard vehicle mirror they can be configured to reside in and/or be supported by an exterior housing 20. In one embodiment, the shape of the housing 20 is such that it accommodates the horizontally-convex portion 50, such that it can provide support and protection for the rigid mirror 10 without obstructing the view therein. It would be within the skill of a person trained in the art to configure a housing suitable for attachment of a mirror of the subject invention. It would further be within the skill of a person trained in the art to configure a mirror of the subject invention as a factory installed component. Such variations are considered to be within the scope of the subject invention.

A horizontally-convex mirror 10 of the subject invention can also be configured as an "add-on" component that can be fixedly or removably attached to a vehicle, such as, for example, an existing vehicle mirror, to increase a driver's FOV. An alternative embodiment provides only the horizontally-convex portion 50 configured as a separate mirror component 80, which can also be fixedly or removably attachable to a standard flat-plane mirror 25 or the outer housing 20 of an existing vehicle mirror. This embodiment can also include a shorter portion of a flat-plane mirror. This shorter flat-plane portion can overlap an existing flat-plane mirror. FIG. 11 illustrates an embodiment of a separate mirror component 80 having a horizontally-convex portion 50.

In one embodiment, the subject invention provides methods and/or devices for attaching a rigid mirror 10 of the subject invention or a horizontally-convex separate component 80 to a vehicle as a separate or after-market add-on component. With this embodiment, the FOV of an existing side-view mirror can be increased to include more of the lateral outboard area 100, thus minimizing or eliminating the typical blind-spot area caused by typical vehicle side-view mirrors. This allows a driver to retain the original mirror, but provides an increased FOV by attachment of a horizontally-convex mirror 10 or separate mirror component 80 without loss of distance perception.

In one embodiment, the horizontally-convex separate component is attached, either temporarily or permanently, at or about the lateral end 18 of a standard mirror 25 or to a standard mirror housing 20. To facilitate this attachment, one or more structures, devices, or features can be included on or with the separate component. In one embodiment, the separate component has an adhesive 82 on the rear surface 14 that can adhere the separate component to a standard mirror. For example, the separate component can include an adhesive on or about the proximal side 16 of the rear surface 14 that would allow the separate component to be adhered at or about the distal side 18 of the front surface of the standard mirror 25.

Alternatively, one or more attachment devices 84, such as for example, various types of clips, straps, suction cups, elastic bands, wires, or other known attachment devices can be utilized to removably attach a horizontally-convex rigid mirror 10 or a separate mirror component to a standard mirror 25 or to a standard mirror housing 20. FIGS. 11 and 12 illustrate embodiments of a horizontally-convex rigid mirror 10 and a separate mirror component 80 utilizing multiple clips for attaching to an existing mirror structure. Preferably, any form of attachment of the separate component would not inhibit the FOV of the rigid mirror 10 and/or the existing mirror and would increase the FOV to include the full lateral outboard side to a point approximately adjacent to the driver. A person with skill in the art, having benefit of the subject disclosure, would be able to determine any of a variety of techniques and devices for attaching a horizontally-convex separate component 80 to a standard mirror. Such variations are within the scope of the subject invention.

In a further embodiment, the rear surface 14 of a mirror can be configured with one or more spacers 86, as shown, for example, in FIGS. 7 and 12. A spacer can fill gaps or voids between the rear surface 14 and another surface to which the mirror of the subject invention may be attached. A spacer can also protect the surfaces. In one example, shown in FIG. 12, a mirror of the subject invention can be configured with one or more attachment structures 84 for affixing to an already existing vehicle mirror. A spacer 86 can also be attached somewhere on the rear surface 14 so that when the mirror of the subject invention is attached to the vehicle mirror, the two mirror surfaces are held some distance apart to prevent damage. Preferably, the attachment structures 84 and/or the spacer(s) 86 allow the mirror of the subject invention to be adjustable in the same manner as the already existing vehicle mirror.

In some situations, it may be necessary or desirable to mount a mirror of the subject invention, including a horizontally-convex separate component 80, as described above, to an existing side-view mirror housing 20 and/or around an already existing vehicle mirror, particularly if the size of the mirror of the subject invention is larger than the existing mirror. An example of this is shown in FIGS. 8A and 8B, where the size of a mirror embodiment of the subject invention prevents it from being affixed to the already existing mirror. In these situations, one or more spacers 21 can provide support between the mirror of the subject invention and the existing mirror. A spacer 86 can also provide an operable connection to the mirror control mechanisms. Once the two mirrors are in contact by means of one or more spacers and/or attachment components 84, the electronic mechanisms typically utilized on vehicles to control the position of the existing mirror, or manual means, can be used to also control a mirror of the subject invention.

The horizontally convex mirrors of the subject invention can increase the field of view (FOV) of a vehicle driver. Advantageously, they can eliminate the typical blind-spot area afforded by most vehicle mirrors by providing a FOV that can extend across an adjacent driving lane to a point approximately lateral to the driver's peripheral vision. Thus, with the mirrors of the subject invention, an object, such as another vehicle in a position at the rear of and lateral to a driver, can remain in the view of the mirror at all times and until such point that the object is lateral to the driver and visible without aid of any side-view mirror. The mirrors of the subject invention are advantageous over currently known curved mirrors because they provide an increased FOV beyond that provided by current mirrors without significantly increasing the overall size or length of the mirror, making it more practical to use on a vehicle. The embodiments herein also provide a mirror image that is compressed only horizontally, thus preserving the vertical dimensions of an object viewed therein. This provides the further advantage of allowing a driver to make a more accurate determination of an object's distance.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also incorporated by reference.

The examples and embodiments described herein are for illustrative purposes only and various modifications or changes in light thereof will be suggested to persons skilled in the art and are to be included within the spirit and purview of this application.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is within the purview of one skilled in the art to affect such feature, structure, or characteristic in connection with other ones of the embodiments.

The invention has been described herein in considerable detail, in order to comply with the patent Statutes and to provide those skilled in the art with information needed to apply the novel principles, and to construct and use such specialized components as are required. However, the invention can be carried out by specifically different equipment and devices, and various modifications, both as to equipment details and operating procedures, can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

I claim:

1. A side-view mirror comprising:
   a rigid mirror, adapted to be attached to a vehicle, the rigid mirror having reflective properties and comprising,
      a front surface and a rear surface,
      a planar portion nearer to a proximal side of the mirror, and
      a horizontally-convex portion continuous with the planar portion and extending from a distal side of the mirror, where the horizontally convex portion has a single radius of curvature and curves so that the proximal edge is directed towards the rear surface,
   such that, the side-view mirror, when installed on the vehicle, has the planar portion nearest to the vehicle and the horizontally-convex portion furthest from the vehicle and an image in the mirror is viewed uninterrupted along the entire length of the front surface mirror.

2. The side-view mirror according to claim 1, wherein the horizontally-convex portion provides a field of view of between approximately 30° and approximately 35° outboard from a vehicle.

3. The side-view mirror according to claim 1, wherein the horizontally-convex portion provides a field of view of approximately 33° outboard from a vehicle.

4. The side view mirror according to claim 2, wherein the radius of the arc is between approximately 15.25 inches and approximately 36 inches.

5. The side-view mirror according to claim 4, wherein the planar portion has a length of between approximately 4 inches to approximately 5.0 inches from the proximal to the distal side.

6. The side-view mirror according to claim 5, wherein the horizontally-convex portion provides a reflected image wherein the vertical dimensions of the image remain constant and the horizontal dimensions appear compressed.

7. The side-view mirror, according to claim 6, further comprising one or more attachment devices.

8. The side-view mirror, according to claim 7, wherein the attachment devices affix the side-view mirror to an existing structure on a vehicle.

9. The side-view mirror, according to claim 8, wherein the existing structure is a side-view mirror within a housing that is fixedly attached to the vehicle.

10. The side-view mirror, according to claim 9, further comprising one or more spacers.

11. A method for increasing a field of view from a vehicle, said method comprising:
    attaching to the vehicle a side-view mirror comprising a rigid mirror with reflective properties,
    a front surface and a rear surface,
    a planar portion nearer to a proximal side of the mirror,
    a horizontally-convex portion continuous with the planar portion and extending from a distal side of the mirror, wherein the horizontally convex portion has a single radius of curvature and curves so that the proximal edge is directed towards the rear surface,
    such that, when the side-view mirror is attached to the vehicle, the planar portion is nearest to the vehicle and the horizontally-convex portion is furthest from the vehicle and an image in the mirror is viewed uninterrupted along the entire length of the front surface of the minor.

12. The method according to claim 11, wherein the horizontally-convex portion provides a field of view of between approximately 30° and approximately 35° outboard from a vehicle.

13. The method according to claim 12, wherein the horizontally-convex portion provides a field of view of approximately 33° outboard from a vehicle.

14. The method according to claim 12, further comprising attaching the rigid mirror to an existing side-view mirror on the vehicle.

15. The method according to claim 14, further comprising adjusting the rigid mirror by adjusting the existing side-view mirror to which the rigid mirror is attached.

16. The side view mirror according to claim 12, wherein the radius of the arc is between approximately 15.25 inches and approximately 36 inches.

17. The method according to claim 16, wherein the planar portion has a length of between approximately 4 to 4.5 inches from the proximal to the distal side.

18. The method according to claim 17, wherein the horizontally-convex portion provides a reflected image wherein the vertical dimensions of an image remain constant and the horizontal dimensions appear compressed.

19. The method according to claim 18, wherein the rigid mirror further comprises one or more attachment devices.

20. The method, according to claim 19, wherein the rigid mirror further comprises one or more spacers.

21. The side-view mirror according to claim 5, wherein the horizontally-convex portion has a length of between approximately 2.0 inches to approximately 3.5 inches from the proximal to the distal side, which is equivalent to an arc of between approximately 5.5° and approximately 7.5°.

22. The side-view mirror according to claim 17, wherein the horizontally-convex portion has a length of between approximately 2.0 inches to approximately 3.5 inches from the proximal to the distal side, which is equivalent to an arc of between approximately 5.5° and approximately 7.5°.

\* \* \* \* \*